United States Patent [19]
Moyers, Jr.

[11] 3,941,999
[45] Mar. 2, 1976

[54] AUTOMATIC FOCUS PULSE GATED SYSTEM

[75] Inventor: Thomas E. Moyers, Jr., Woodbridge, Va.

[73] Assignee: The United States of America as represented by the Secretary of the Army, Washington, D.C.

[22] Filed: Apr. 1, 1975

[21] Appl. No.: 564,526

[52] U.S. Cl.............................. 250/213 VT; 356/5
[51] Int. Cl.² ........................................ H01J 31/50
[58] Field of Search . 250/201, 204, 213 R, 213 VT; 315/149, 150, 157–159; 328/2; 356/5

[56] References Cited
UNITED STATES PATENTS

| | | | |
|---|---|---|---|
| 3,682,553 | 8/1972 | Kapany | 356/5 |
| 3,903,451 | 9/1975 | Hall et al. | 250/213 VT |

Primary Examiner—Archie R. Borchelt
Assistant Examiner—D. C. Nelms
Attorney, Agent, or Firm—Nathan Edelberg; Robert P. Gibson; John E. Holford

[57] ABSTRACT

An improved active type of infrared viewing system is provided using pulse gated techniques which displays the complete Z (range) axis simultaneously and provides uniform image intensity at all ranges.

8 Claims, 1 Drawing Figure

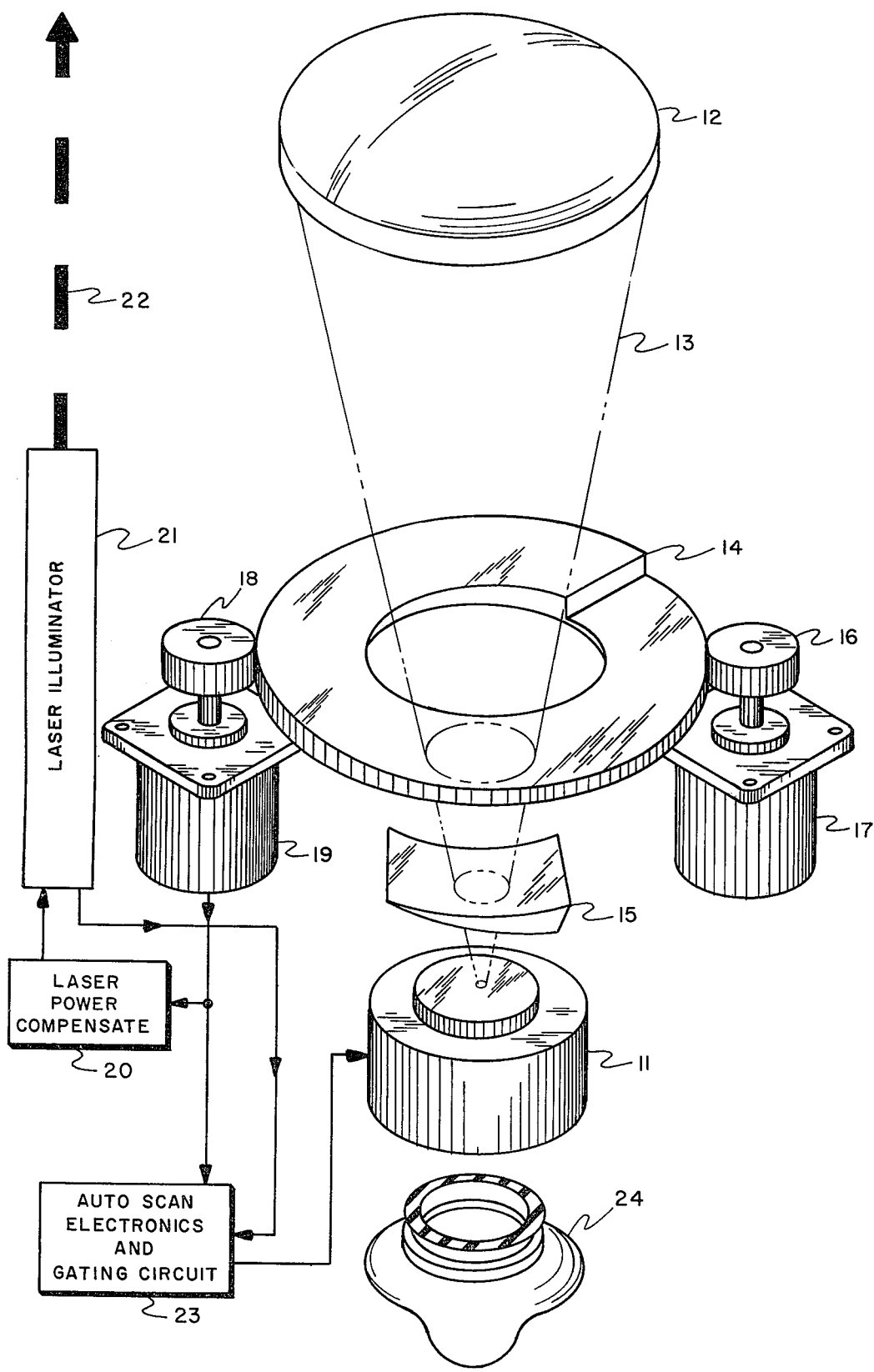

AUTOMATIC FOCUS PULSE GATED SYSTEM

The invention described herein may be manufactured, used, and licensed by or for the Government for governmental purposes without the payment to me of any royalty thereon.

BACKGROUND OF THE INVENTION

A number of surveillance and target acquisition systems have been developed which employ a gated image intensifier tube. By using a very narrow widely spaced gating pulse the blooming effects of strong illumination sources in the field of view can be minimized. To compensate for the loss of illumination in other areas of the field of view a very intense source of gated illumination is operated in synchronism with the intensifier tube. If the illuminator emits essentially monochromatic or invisible light selective filters can be used to improve the contrast in the image and reduce the chances of saturation.

A characteristic of the device which can be used to great advantage is the narrow and uniform depth of field at all ranges. This permits the observer to examine the solid angle of view slice by slice for objects and parts of objects without the background clutter often encountered with ordinary viewers. It does, however, have the disadvantage that the observer loses the overall picture of what is occurring in the complete solid angle at any one time. A less obvious disadvantage which can be compensated manually in the above system is that the overall brightness level must be adjusted for each range due to the square law reduction in illumination.

BRIEF DESCRIPTION OF THE INVENTION

It is, therefore, an object of the invention to provide an active pulse gated viewing system which permits viewing of the entire scene in depth, when desired.

It is a further object to provide a system as described above in which the decrease in image brightness with range inherent in the illuminator is compensated by the circuitry of the image intensifier tube.

BRIEF DESCRIPTION OF THE DRAWINGS

These and other objects of the invention will be best understood with reference to the accompanying drawings wherein the FIGURE shows the essential working parts of the system with the viewer body and individual support elements removed for clarity and the electronic parts indicated in block form only.

DESCRIPTION OF THE INVENTION

The heart of the viewer is an image intensifier tube 11, various sizes of which are standard items of procurement in the military services and are likewise available for civilian applications. As shown, the upper end of the tube is constituted by its photocathode and the lower end by its phosphor screen. An objective lens 12 which may contain a number of elements focusses a distant image onto the photocathode end of the tube, the light from each point on the image diverging in a conical beam 13.

For purposes of the present invention a toroidal member of dielectric material transparent to light such as glass, quartz, lucite or other plastic material is interposed into the beam. The thickness of the material is constant in the radial and axial directions and varies linearly in the circumferential direction except for a single step which separates the end and the origin of the linear function. Additional steps may be provided, if more than one cycle of the function is desired, by those with ordinary skill in the art.

The function of the above described number is to effectively vary the focal length of the objective lens. Since the effective focal length depends on the velocity of light in the media in which it is measured, the portion of the conical beam in dielectric member 14 appears longer than a portion of the same actual length in free space (or atmosphere). The circumferential variation in thickness within the beam can be made very small by using a toroidal dielectric member of very large diameter. Since this is not always practical it is preferred that a compensating segment 15 be also interposed in the path of the beam. Ideally the thickness of the segment where any light ray from the scene passes when added to the same thickness of the toroidal member will be a constant and the thicknss of the former for one ray will be zero. Actually any wedge which is taken from a second toroidal member having a linear circumferential variation inverse to that of member 14 will serve.

The toroidal member is mounted for rotation in the housing (not shown) of the viewer using any type of bearing structure, numerous examples of which are available in the prior art. A drive means 16; such as a friction wheel, belt drive or pinion gear or the like; couples the toroidal member to a motor 17. The drive means can also be operated manually, although rotational speeds of 10 cycles per second or more (which produce flickerless images) are not easily achieved or maintained manually. A driven member 18 which preferably contacts the toroidal member 19 (or the drive member 16 if it makes no-slip contact with the toroidal member) operates a linear potentiometer, pulse generator, or similar device to provide an indication of the torroidal -ember's angular position relative to the beam 13.

The enclosed angular information signal, which may be either analog or digital in form, controls two functions. Applied to the illuminator power supply 20 is reduces the output power in beam 22 inversely with range. This provides a better image for the observer to analyze and make the most efficient use of available power. Applied to the auto-scan electronics and gating-circuits 23, the encoded signal determines the delay between a trigger pulse (the firing pulse of the laser) and an enabling pulse fed to image intensifier 11. In this manner the objective focus and image intensifier are synchronized to the reflected light pulses from the scene. The system is completed by adding a suitable eyepiece to magnify the image on the phosphor screen end of tube 11. This can be equipped with shades and filters to minimize the effect of ambient light. A biocular lens provides the best eye relief for the observer.

Many variations of the above described elements will occur to those skilled in the art, but the invention is to be limited only as defined in the claims which follow.

I claim:

1. In an image viewing system having a pulse gated image intensifier tube, an integral source of synchronized illumination, a variable delay means for said gating pulse, means to generate said gating pulse and a manually focussed objective lens, the improvement comprising:
    automatic means for continuously varying the effective focal length of said objective lens and the delay of said delay means in concert.

2. An image intensifier according to claim 1 wherein said automatic means continuously varies the dielectric constant of a preselected path length which is equal for all light rays from said illuminator passing through said objective lens.

3. An image intensifier according to claim 1 wherein said automatic means includes a first solid dielectric member having portions of various thicknesses parallel to the light rays from said illuminator passing through said objective lens; and drive means for moving said first member so that said portions appear alternately in the path of said rays.

4. An image intensifier according to claim 3 wherein:

the thickness of said member varies linearly in the direction of motion of said member; and a second member having a thickness varying in inverse relationship to said first member is placed in fixed relationship to and in the path of said light rays.

5. An image intensifier according to claim 1 wherein said automatic means simultaneously varies the overall intensity level of said intensifier tube.

6. An image intensifier according to claim 2 wherein said automatic means simultaneously varies the overall intensity level of said intensifier tube.

7. An image intensifier according to claim 3 wherein said automatic means simultaneously varies the overall intensity level of said intensifier tube.

8. An image intensifier according to claim 4 wherein said automatic means simultaneously varies the overall intensity level of said intensifier tube.

* * * * *